US008396665B2

(12) United States Patent
Siereveld et al.

(10) Patent No.: US 8,396,665 B2
(45) Date of Patent: *Mar. 12, 2013

(54) PORTABLE NAVIGATION DEVICE

(75) Inventors: Martin Siereveld, Den Haag (NL);
Jochem de Jong, Enkhuizen (NL);
Serhiy Tkachenko, Gelderop (NL)

(73) Assignee: TomTom International B.V.,
Amsterdam (NL)

( * ) Notice: Subject to any disclaimer, the term of this patent is extended or adjusted under 35 U.S.C. 154(b) by 486 days.

This patent is subject to a terminal disclaimer.

(21) Appl. No.: 12/311,134

(22) PCT Filed: Sep. 27, 2007

(86) PCT No.: PCT/EP2007/008422
§ 371 (c)(1),
(2), (4) Date: Mar. 19, 2009

(87) PCT Pub. No.: WO2008/037472
PCT Pub. Date: Apr. 3, 2008

(65) Prior Publication Data
US 2010/0004853 A1    Jan. 7, 2010

(30) Foreign Application Priority Data

| Sep. 27, 2006 | (GB) | 0619054.0 |
| Sep. 27, 2006 | (GB) | 0619055.7 |
| Sep. 27, 2006 | (GB) | 0619057.3 |
| Sep. 27, 2006 | (GB) | 0619058.1 |
| Sep. 27, 2006 | (GB) | 0619065.6 |
| Sep. 27, 2006 | (GB) | 0619075.5 |
| Sep. 27, 2006 | (GB) | 0619081.3 |

(51) Int. Cl.
*G01C 21/34* (2006.01)
(52) U.S. Cl. ......... 701/533; 701/425; 701/427; 701/539
(58) Field of Classification Search .................... None
See application file for complete search history.

(56) References Cited

U.S. PATENT DOCUMENTS

| 7,046,638 B1 | 5/2006 | Klausner et al. |
| 2002/0140548 A1 | 10/2002 | Lutter et al. |

(Continued)

FOREIGN PATENT DOCUMENTS
CN           1403908 A       3/2003
(Continued)

OTHER PUBLICATIONS

An English language abstract of WO Publication No. WO 2006010660, published Mar. 23, 2006.

(Continued)

*Primary Examiner* — Faris Almatrahi

(57) ABSTRACT

A portable navigation device (PND) is disclosed comprising processing means, a graphical display, memory, map data stored in said memory, user-input means, and signal reception means for receiving one or more wireless signals by means of which the processor can determine a present location of the device and in conjunction with user input desired destination information, and perform route calculation and subsequent navigation functions, such being performed by software installed on the device. The PND is additionally provided with a connector by means of which said PND can be physically connected to third party devices or systems. The invention is characterized in that said PND is adapted to establish a communication, via said physical connection, with a vehicle controller area network consisting thus becoming a node thereon and capable of communicating with other nodes thereon, each of said nodes having functionality represented by one or more signals distributed around said controller area network and received by said PND. The invention is further characterized in that said PND includes a first software translation layer enabling the communication between PND and one or more nodes, and a second software routine layer comprising one or more routines specific to the functionality of one or more of said other nodes so as to effectively communicate therewith and utilize their functionality. Examples of third party devices include hands-free communications modules, gateway nodes, the vehicle stereo system, engine management system, seat position controllers, multifunction steering wheel, dashboard and console displays, integrated navigation systems, and the like. The invention allows the PND either to receive and interpret information from the controller area network and retrieve information from one or more devices forming nodes on that network for display on the PND or improved operation thereof, or to cause control or state change of one or more of the devices forming nodes on the controller area network. Voice control of the PND is also possible in the case a voice recognition system is provided as a node on the controller area network, and additionally, the vocal instructions issued by the PND can be caused to be replayed through the car stereo, if such is also connected to the controller area network within the vehicle.

21 Claims, 1 Drawing Sheet

U.S. PATENT DOCUMENTS

| | | |
|---|---|---|
| 2003/0060973 A1 | 3/2003 | Mathews et al. |
| 2003/0114980 A1* | 6/2003 | Klausner et al. ............. 701/207 |
| 2003/0212485 A1 | 11/2003 | Michmerhuizen |
| 2004/0039509 A1 | 2/2004 | Breed |
| 2004/0133319 A1 | 7/2004 | Pillar et al. |
| 2004/0139238 A1* | 7/2004 | Luhrs ............................... 710/1 |
| 2005/0075119 A1 | 4/2005 | Sheha et al. |
| 2005/0288837 A1 | 12/2005 | Wiegand et al. |
| 2006/0019713 A1 | 1/2006 | Rokusek et al. |
| 2006/0140210 A1 | 6/2006 | Yates et al. |
| 2006/0200284 A1 | 9/2006 | Hwang |
| 2007/0118280 A1* | 5/2007 | Uhlmann et al. ............. 701/208 |
| 2008/0183376 A1 | 7/2008 | Knockeart et al. |

FOREIGN PATENT DOCUMENTS

| | | |
|---|---|---|
| DE | 10 2004 036 564 | 3/2006 |
| EP | 1130560 A | 9/2001 |
| EP | 1246414 A2 | 10/2002 |
| EP | 1 548 683 | 6/2005 |
| EP | 1 662 230 | 5/2006 |
| WO | 0072463 A | 11/2000 |
| WO | 0074019 A1 | 12/2000 |
| WO | 2005024781 A1 | 3/2005 |

OTHER PUBLICATIONS

International Search Report issued Jul. 7, 2008 for International Application No. PCTIEP2007/008421.

International Search Report issued Jul. 8, 2008 for International Application No. PCTIEP2007/008422.

* cited by examiner

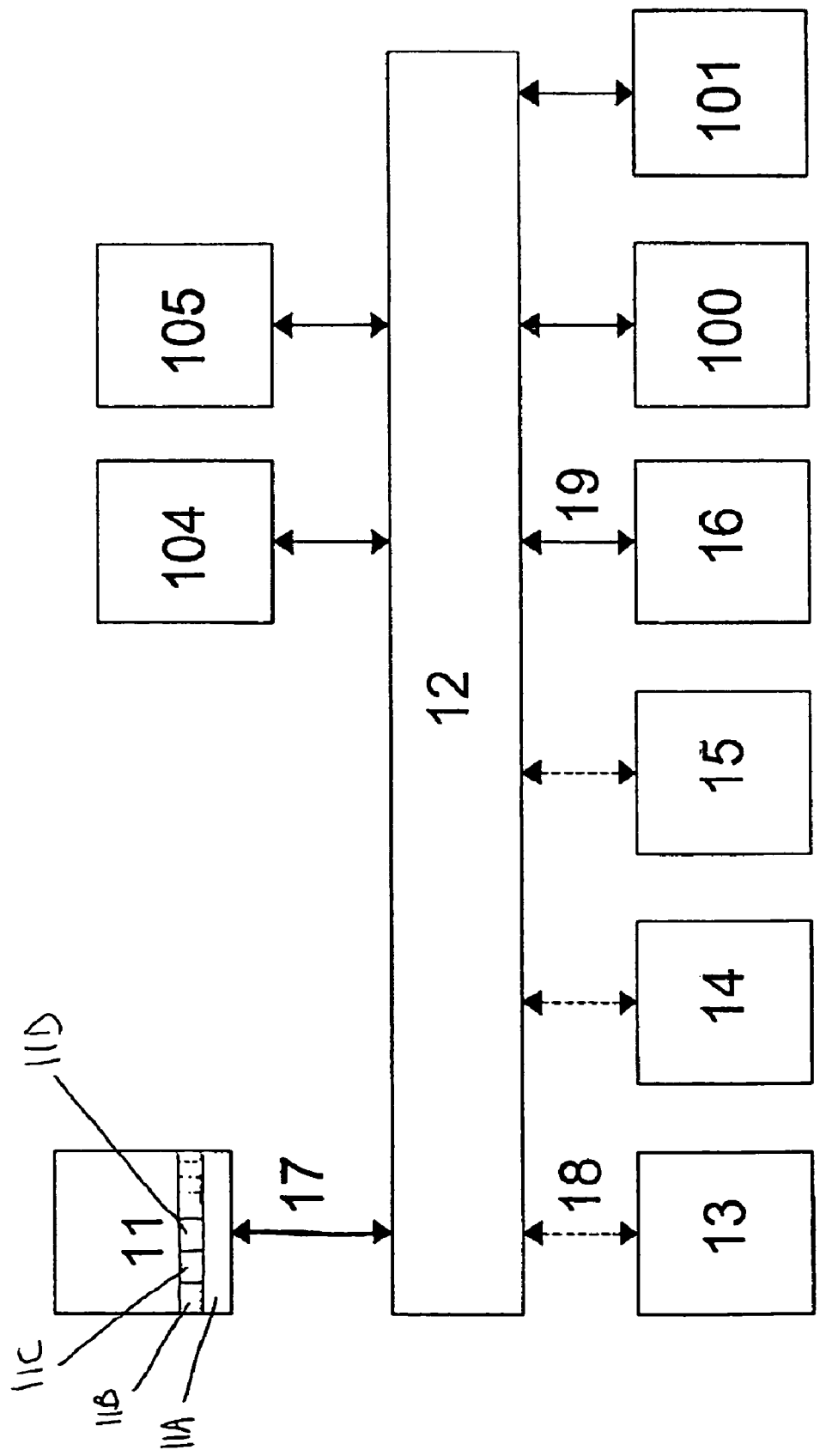

PORTABLE NAVIGATION DEVICE

This invention relates to a portable navigation device; in particular, it defines a portable navigation device that can interface with systems in a motor vehicle.

A portable navigation device ('PND') is a device that provides route guidance based on location data derived from satellite signals (e.g. GPS or Galileo) and route finding algorithms running on the device. The device can be readily mounted in, and taken from, a vehicle. It is therefore unlike an embedded navigation device that is installed as part of the factory build of the vehicle and is meant to be a permanent system within the vehicle.

BACKGROUND OF THE INVENTION

Portable navigation devices, such as the GO™ and ONE™ devices from TomTom International B.V., are increasingly popular for in-vehicle navigation. Embedded in-vehicle navigation systems, by contrast, are falling in overall market share. There are several reasons for this. First, embedded in-vehicle navigation systems are significantly more costly for the end-user. Secondly, they generally do not include the latest technology: when designing a highly complex product such as a motor vehicle, the design of the in-vehicle navigation systems has to be frozen typically 3 years before the vehicle is launched. This is to give enough time for the complex integration and testing that needs to be done for a system embedded into a vehicle, and the long lead times of setting up manufacturing assembly lines for motor vehicles. So an expensive motor vehicle, 5 years after launch, may be offered with an embedded navigation system that is at least 8 years old, and possibly older. By contrast, portable navigation devices tend to be updated at least yearly: new models may have more sensitive GPS chipsets, better maps, faster processors, as well as improved functionality such as real time traffic data. And they are generally far cheaper than embedded navigation systems.

Portable navigation devices have in the past generally had no ability to interface with factory installed equipment or systems in the vehicle, such as the embedded factory-fitted vehicle stereo. One limited exception is that it is possible to connect the TomTom GO wirelessly to a Bluetooth™ interface box that is installed into a vehicle, behind the dashboard, as an after-market accessory (i.e. it is not factory fitted); the interface box is then connected by wires by a skilled installer to the in-vehicle stereo. One interface product that does this is the TomTom Car Connect™. The TomTom Car Connect system, released on late 2006 and hence not necessarily relevant prior art, whilst allowing the PND to wirelessly connect to an interface box, still required the interface box itself to be professionally installed behind the vehicle dashboard. However, take up of this is likely to be quite limited because most ordinary users do not want the trouble or cost of professionally installing a dedicated interface box behind their vehicle dashboard for their GO portable navigation device.

Another solution has been used in the Toyota Aygo; this motor vehicle required the GO dock to be permanently hard wired to an interface box, in turn hard wired to the radio/speakers of the vehicle. This was done as part of the factory build. The user could then simply mount the GO onto the dock whenever needed. But again, the cost and trouble of installing a dedicated interface box is considerable. A permanently installed dock for the portable navigation device can also require adaptation of the dashboard.

It is however known to provide a wireless interface connected to the in-vehicle stereo to enable mobile telephones to be used in a hands-free mode. The Parrot™ Bluetooth hands-free vehicle kits are well known examples. But, as with the TomTom Car Connect™ device, these kits require careful installation, which limits their appeal.

Reference may be made to WO 00/72463, which discloses a wireless communication system for use in a vehicle. It enables notebooks computers, cellphones, and pagers to communicate over a short range wireless network with factory-installed subsystems in the vehicle, such as an on-board navigation system. But, it does not describe enabling a portable navigation device to communicate with the factory installed subsystems at all. The same can be said of WO 2005/024781; this describes connecting various wireless enabled devices, such as mobile phones, to a voice recognition engine. Although it does describe connecting a GPS device to the voice recognition engine, the GPS device is not described as having any kind of wireless interface; the reasonable inference is that it is an embedded navigation device and not a portable navigation device.

Reference may also be made to US 2006/0140210: this describes an automotive data bus that enables devices such as cell phones, garage door openers etc. to be wirelessly connected to an in-vehicle data bus and hence to the factory-fitted items that are connected to that data bus, such as the CD player, multi-function steering wheel etc. It does suggest that an external GPS receiver can be connected to the data bus, but adds that one of the existing devices on the data bus that the GPS receiver can connect with is a navigation system. This disclosure hence appears to contemplate being able to enhance the performance of a factory-fitted, embedded navigation system by connecting it to an external GPS receiver over the data bus. Again, this document does not deal with interfacing a portable navigation device to the factory fitted systems of a motor vehicle.

In US 2002/0140548, an in-vehicle wireless network is described; the GPS navigation system is not a portable navigation device but an embedded device built into the trunk. US 2004/0133319 describes how a portable digital assistant with no navigation capability can be used to interface with systems in a vehicle, and again does not relate to a portable navigation device. US 2003/0212485 also deals with enabling a portable computing device, which is explicitly distinguished from autonomous route guidance systems like portable navigation devices, to interface with vehicle systems. In WO00/74019, a PDA is linked to an embedded navigation system.

US2003/0114980 discloses a method and system for a wireless interface to the electronics of an automotive vehicle for a remote application in the vehicle or within communication range of the vehicle. The remote application may be a navigation system using vehicle motion sensor data to provide or improve a navigation solution for the vehicle. In an alternative embodiment, the remote application is diagnostic software running on a handheld computer that evaluates vehicle systems in a diagnostics procedure. This document also describes a system for navigating a vehicle including a vehicle sensor connected to a vehicle bus connected to a gateway node, and a processor in the vehicle communicating wirelessly with the gateway node and connected to a vehicle positioning system. The sensor measures a value and then transmits the value over the vehicle bus to the gateway node using a network protocol. The gateway node then wirelessly transmits the value to the processor using a wireless communication protocol. The processor receives an initial position from the positioning device and calculates a current position using a former position, the initial position, and the sensor value. A protocol translation device is disclosed that may include two different protocols and an intermediate, networkindependent protocol. In one embodiment of the invention, an emerging worldwide standard, Bluetooth, created by the Wireless Personal Area Network (WPAN) Working Group (IEEE 802.15), provides a wireless interface to the electronics in the vehicle via a Controller Area Network (CAN). CAN is an international standard documented in ISO 11898 (for high-speed applications) and ISO 11519 (for lower-speed applications). A remote application, such as a navigation system or a hand-held computer running navigation software, can connect to this interface via a host inside the vehicle or within communication range of the vehicle.

Additionally, U.S. patent application Ser. No. 09/687,181 describes a system for providing short-range wireless access to data on vehicle buses and data in the memory of electronic control units (ECUs) via a wireless link. This application discusses interfacing a CAN (Controller Area Network) protocol on the vehicle bus communicating with a gateway node and Bluetooth hardware set.

SUMMARY OF THE INVENTION

The invention is as described in the appended claims.

BRIEF DESCRIPTION OF THE DRAWINGS

FIG. 1 is a diagram of a vehicle data transfer network and of devices which may communicate via the data transfer network.

DETAILED DESCRIPTION

The present invention will be described with reference to an implementation of a portable navigation device that can be used in a motor vehicle. The PND implementation includes a number of key features:

The PND is adapted to interface with a data bus that is factory installed in a motor vehicle and that transmits data between factory installed subsystems of the vehicle.

The PND is adapted to exchange data with a data bus factory installed in a motor vehicle, in which the device is automatically sent information over the data bus and that information is used in route guidance by the device.

The PND is adapted to interface with an interactive voice recognition subsystem that is in communication with a factory installed data bus in a motor vehicle and which enables hands free calling, the voice recognition subsystem processing voice navigation instructions from a user.

The PND is adapted to generate voice guidance instructions and to send data encoding those instructions over an open, standards based audio streaming protocol, via a factory installed vehicle data bus, to a communications module/subsystem that is factory installed in a motor vehicle to enable the voice guidance to be output from speakers that are also factory installed in the motor vehicle The PND is adapted to be automatically customised to a given user when that user uniquely identifies himself or herself by using a function of an embedded, factory fitted subsystem of a motor vehicle in communication with a factory installed data bus.

The PND is adapted to connect with a factory installed data bus in a vehicle and to provide a touch screen operable to display controls or menu items that enable a user to select, control or receive and/or display information from a factory installed subsystem that is also connected to the data bus.

An example of an embodiment of the invention is shown in FIG. 1. The system of FIG. 1 is present in or on a vehicle. The vehicle may be an automobile, a van, a truck, a motorbike, a vehicular bus or coach, a mobile home, a recreational vehicle, a tank, an armoured personnel carrier, an off-road vehicle, a ship, a boat or any other kind of known motor vehicle. In FIG. 1 the portable navigation device 11 is connected via a physical connection 17, such as a simple cable, to network data bus 12. Connection 17 may comprise a connection through which the portable navigation device 11 is able to send or receive data from the network data bus 12 by becoming a node of the vehicle controller area network. Devices 13, 14 and 15 are also connected via wireless connections to the data bus 12 and form other nodes of the overall controller area network Devices 16, 100, 101, 104 and 105 are connected to the data bus 12 via non-wireless connections which could be electrical connections, for example. 18 is an example of a wireless connection. 19 is an example of a non-wireless connection. Examples of devices 13, 14 and 15 are a garage door opener, a security gate opening and closing device and a device which enables connection to the internet, respectively. Examples of devices 16, 100, 101, 104 and 105 are a fog light, an on-board computer, a vehicle audio and speaker system, a voice recognition interface and system, and a fuel level sensor in a fuel tank, respectively. An example of network bus 12 is a CAN bus, with the devices 13, 14, 15, 16, 100, 101, 104, 105 being generically termed subsystems or nodes of the network under the control of said bus 12. Many other examples of embodiments of the invention will be evident to those skilled in the art. FIG. 1 shows that apart from the portable navigation device 11, three other devices 13, 14 and 15 are connected wirelessly to the network data bus 12, and five other devices 16, 100, 101, 104 and 105 are connected to the network data bus 12 via non-wireless connections, but those skilled in the art will appreciate that any number of devices may be connected to network data bus 12 through wireless or non-wireless connections.

In accordance with the invention, the PND 11 is provided with operating software, a first software translation layer 11A and a second software routine layer comprising one or more routines 11B, 11C, 11D specific to the functionality of one or more of the other nodes or devices 13, 14, 15, 16, 100, 101, 104, 105, so as to effectively communicate therewith and utilize their functionality. The translation software layer is provided on the PND to convert the signals proprietary to the controller area network in general and the various devices provided therein to those proprietary to or recognizable by either the PND operating software, and/or the one or more routines 11B, 11C, 11D which interact therewith. Accordingly, the layer 11A acts as a software and/or hardware gateway between the PND and the vehicle controller area network so as to create effective two-way communication between the PND and the vehicle data bus, the controller area network in general, and the nodes therein.

Furthermore it is to be mentioned that the controller area network (CAN) comprises both the bus 12 and the various nodes connected thereto. In FIG. 1, the topology of the network is a star topology, but other topologies are possible, in particular a ring, mesh, tree, line or fully connected topologies are possible and contemplated within this invention.

Here is an example of the effects which may be realized by the embodiment of the invention shown in FIG. 1. A driver of a vehicle in which the system shown in FIG. 1 is present approaches his home which is protected by a security gate. The portable navigation device 11 recognizes that the vehicle's position and trajectory and determine that it is a short time from arriving at the destination security gate. The portable navigation device 11 instructs the security gate opening and closing device 14 through bus 12 to open the security gate. When the portable navigation device 11 recognizes that the vehicle's position and trajectory mean that it has passed through the security gate, the portable navigation device 11 instructs the security gate opening and closing device 14 through bus 12 to close the security gate. The portable navigation device 11 then instructs the garage door opener 13 through bus 12 to open the garage door. Note these opening and closing operations are achieved without the driver having to issue any verbal instructions or press any buttons. Some vehicle drivers may find this reduction in exertion to be of benefit. The above functions will have been set up using a menu on the portable navigation device 11 which enables the relevant data packets to be transmitted to the relevant devices as the vehicle arrives within a defined distance of a particular map location, such as the location of the security gate at the entrance to the driver's home.

A further example of an embodiment of the invention shown in FIG. 1 is of a driver in her vehicle in which the system shown in FIG. 1 is present. The vehicle is in motion and is shortly about to enter a stretch of the journey where visibility is poor due to fog and it would be safety enhancing if the vehicle fog light were switched on. At suitable times the portable navigation device 11 searches the internet via device 15 for data on which regions in the country are considered to have levels of fog which pose a hazard to drivers. Such data could be provided by a national meteorological office, for example. Based on the position of the vehicle and its intended journey as known by the portable navigation device 11, the portable navigation device 11 turns on the fog light 16 through bus 12 shortly before the vehicle enters the area which is forecast to have fog. The portable navigation device 11 turns off the fog light 16 through bus 12 shortly after the vehicle exits the area which is forecast to have fog. The greater the number of vehicles in which connectivity is implemented to allow illumination of fog lights as a result of a decision taken by the portable navigation device 11 based on information which can be obtained from the internet used in conjunction with information which is known by a portable navigation device 11, the greater will be the contribution to improved road safety. Advantageously, such connectivity reduces the risk that drivers with a low level of alertness or with a low level of safety awareness will be responsible for causing traffic accidents due to the lack of use of fog lights, for example. Advantageously, some multiple vehicle pileups on busy roads in foggy weather may thereby be avoided, for example, which would be of benefit to the individuals who would have been inconvenienced by such events.

A further example of an embodiment of the invention shown in FIG. 1 is of a driver in her vehicle in which the system shown in FIG. 1 is present. The vehicle is in motion but is currently on a journey path which will take it through a place where traffic congestion has recently arisen, such as due to a recent traffic accident. At suitable times the portable navigation device 11 searches the internet via device 15 for data on places where congestion has recently arisen. Alternatively, traffic data could be sent to the device using some other mechanism (e.g. the device could itself have a communications capability, such as an internal GPRS or GSM chipset; the device could connect to a nearby mobile telephone over the local piconet, and the phone could then connect to a remote traffic data server. In any event, such data could be provided by an internet data provision service on a subscription basis, for example. Such data could also be used in planning the journey prior to departure, for example. Based on the position of the vehicle and its intended journey as known by the portable navigation device 11, the portable navigation device 11 searches for the optimal route under the new circumstances. If the optimal route differs from the originally planned route, the portable navigation device 11 advises the driver through the portable navigation device 11 screen and/or through the vehicle speakers 101 that the originally planned route is now no longer optimal, and requests permission to switch to a new route which is optimal under the new circumstances. The driver may accept or decline the request, such as by using the touch screen of the portable navigation device 11 or by issuing a verbal command which is processed by voice recognition interface and system 104. The driver of the vehicle may benefit from a reduced journey time if connectivity is implemented to allow a change in the previously selected vehicle route as a result of a decision taken by the vehicle driver after being offered the choice of a new route by a portable navigation device 11 based on information which can be obtained from the internet used in conjunction with information which is known by a portable navigation device 11.

A further example of an embodiment of the invention shown in FIG. 1 is of a driver in her vehicle in which the system shown in FIG. 1 is present. Prior to departure, the temperature outside the vehicle is measured to see if there may exist a hazard. The portable navigation device 11 may obtain temperature data via the network data bus 12 from a thermometer on the vehicle or from a device which enables connection to the internet 15. For example, if the temperature is below or near to the freezing point of water, the portable navigation device 11 may offer the driver the option of selecting a route which is considered to be safer on the basis that there is a reduced probability of encountering patches of ice on the road in the course of using such a route. Alternatively, on the basis of the temperature data, the portable navigation device 11 may report an increased estimated journey time because slower driving speeds are advisable if the road may contain patches of ice. Alternatively the temperature data measured at the vehicle position may be reported by the portable navigation device 11 via the network data bus 12 to a server, such as via a device which enables connection to the internet 15.

A further example of an embodiment of the invention according to FIG. 1 is as follows. The interface between the portable navigation device 11 and the network bus 12 is a short range wireless link 17 such as a Bluetooth™ link. The operation of the interface between the portable navigation device 11 and the network bus 12, such as setting up or shutting down the interface, may be controlled by a user, who may control the interface by interacting with menu items shown on the portable navigation device screen. The interface may use the advanced audio distribution profile (A2DP) to stream audio for distribution to one or more devices connected to the network bus 12, for example a hi-fi or stereo subsystem including loudspeakers for audible music reproduction, such being digitally achieved by the PND 11. The streamed audio may be in the form of MP3 files, or some other known format. The network bus 12 may be a controller area network (CAN) bus. The vehicle driver selects the journey destination using the portable navigation device 11, and the portable navigation device 11 generates a planned route for the journey. Based on the journey progress, the portable navigation device 11 sends voice navigation instructions which are transmitted in data packet form to the network bus 12. The network bus 12 may also supply these instructions for display on the vehicle dashboard. The network bus 12 then supplies these instructions to the in-vehicle speakers 101. An advantage of the invention is that the driver may then perform navigational actions, such as turning the vehicle left or right when required, without the need to consult the portable navigation device 11 screen: consulting the screen may be inconvenient upon occasions such as when there is a great deal of traffic on the road.

A further example of an embodiment of the invention according to FIG. 1 is as follows. Voice navigation instructions from a user, such as "Road ahead blocked. Find alternative route," are processed by an on-board voice recognition interface and system 104. The on-board voice recognition interface and system 104 recognizes the command as pertaining to a function which is performed by the portable navigation device 11. The voice recognition interface and system 104 then sends an instruction to the portable navigation device 11 via the network bus 12 to perform the required task. It will be appreciated by those skilled in the art that any available function of the portable navigation device 11 may be accessed by a user through issuing a suitable verbal instruction to the voice recognition interface and system 104. For example, functions of the portable navigation device 11 may include performing a slideshow of stored images, changing the screen mode to a navigation mode, disabling recognition of verbal instructions, enabling recognition of verbal instructions, disabling navigation instructions which are sent via the in-vehicle speakers 101, enabling navigation instructions which are sent via the in-vehicle speakers 101, activating a day mode of the device, activating a night mode of the device, zoom in to a map, zoom out from a map, showing points of interest in the vicinity of the vehicle, not showing points of interest in the vicinity of the vehicle, performing handsfree telephone calling, or any known function of the portable navigation device 11. In a video mode, the portable navigation device 11 may stream video data to the network bus 12 for storage in a data storage medium or for display on a display screen in the vehicle. The portable navigation device 11 can be adapted to dock with an internet connected PC (the TomTom Home™ service enables this); movies can hence be readily transferred from the PC to the device 11; the device 11 can then be taken to the vehicle and different movies can then be readily streamed to the in-vehicle entertainment system (which may have display screens for all passengers). This approach enables movies to be viewed in a car without the need to purchase and load a DVD into the in-vehicle entertainment system: as internet distribution of movies (and any other kind of video content; we will refer to them generically as 'movies') becomes the norm, being able to use movies already downloaded to your home PC in your vehicle will become very important: but even the most modern vehicle today is unable to download a movie directly from the internet; it will be many years before cars have embedded systems that enable them to do so. But with this implementation, the PND itself becomes the carrier and mechanism to allow current generation in-vehicle entertainment systems to show movies downloaded to a domestic PC. Likewise, where movies are distributed on portable memory media, it is far quicker and easier to modify a PND to read that media and stream the content out than it is to modify an embedded system.

It will be recognized by those skilled in the art that in order for the portable navigation device 11 to interact successfully with the voice recognition interface and system 104, the voice recognition interface and system 104 should be programmed to identify commands which are intended for the portable navigation device 11. During the vehicle manufacturing process the voice recognition interface and system 104 may be programmed to identify verbal commands which are intended for the portable navigation device 11. Alternatively, the voice recognition interface and system 104 may have software which enables a set of commands and their respective voice signatures represented in some data format to be downloaded from the portable navigation device 11 to the voice recognition interface and system 104 when the portable navigation device 11 and the voice recognition interface and system 104 are first in communication. If the portable navigation device 11 is upgraded with additional features, the full set of commands and their respective voice signatures or the additional set of commands and their respective voice signatures will be downloaded from the portable navigation device 11 to the voice recognition interface and system 104 when the portable navigation device 11 signals to the voice recognition interface and system 104 that a feature upgrade has taken place. In a further alternative, after the portable navigation device 11 model number is transmitted by the portable navigation device 11 to the voice recognition interface and system 104, or the portable navigation device 11 model number is supplied to the voice recognition interface and system 104 by data entry at some data entry point, the voice recognition interface and system 104 may download the data incorporating the set of commands and their respective voice signatures represented in some data format via the network bus 12 from an internet site using device 15 or from a local area network, where the data transmission method is wireless or non-wireless such as via a USB connector, a FireWire connector or any other desired interface, after supplying the internet site or the local area network with the portable navigation device 11 model number. The data on the internet site, or on the local area network, may be maintained by the manufacturer of the portable navigation device 11, or by the manufacturer of the voice recognition interface and system 104, or by cooperation between both manufacturers.

A further example of an embodiment of the invention according to FIG. 1 is as follows. The volume of fuel remaining in the vehicle is calculated by the on-board computer 100 based on data obtained via the network data bus 12 from a fuel tank sensor 105. The data on volume of fuel remaining in the vehicle is accessed from the on-board computer 100 by the portable navigation device 11 via the network data bus 12. Based on the journey selected, the portable navigation device 11 calculates the volume of fuel required to complete the journey. Factors which may be taken into consideration in performing such a calculation include the forecast travel speed on the roads or waterways in the journey, the degree of congestion on the roads or waterways in the journey based on factors such as the time during the day and the day of the week of the intended journey, the fuel efficiency of the vehicle, where the fuel efficiency may be a factor that is supplied by the on-board computer 100 or which may be derived from the recent data on fuel consumed and distance traveled, and the forecast road or waterway conditions such as if the roads are likely to be wet or dry, or if the water on waterway is likely to be rough or calm. If the forecast fraction of the volume of the fuel tank which will contain fuel at the end of the journey is less than some pre-selected amount, such as 20%, then a warning message may be given, such as on the portable navigation device 11 display or via the vehicles speakers 101. Such a message may be similar to "Forecast remaining fuel volume at the end of the journey is eleven percent." If the forecast is that the fuel present will be insufficient for the journey, a warning message may be given, such as on the portable navigation device 11 display or via the vehicle's speakers 101. Such a message may be similar to "Present fuel is forecast to run out after 57% of your journey distance." A series of options could be offered by the portable navigation device 11 such as a revised route where one passes by the nearest fuel station to the journey start point, a revised route which enables one to fill up with fuel with the minimum deviation from the originally planned route, a route which enables one to fill up with fuel as far as possible into the originally planned route without running out of fuel, or an unchanged route. The options could be offered on the portable navigation device 11 display or via the vehicle's speakers 101, or both; the preferred option could be selected via the portable navigation device 11 touch screen or by a verbal command which is processed by the vehicle's voice recognition interface and system 104. Once the option is selected, the selected option may be confirmed by being briefly displayed on the portable navigation device 11 display or by announcement via the vehicle's speakers 101, or both. A simpler embodiment of the above would be to alert the driver during the journey if the volume of the fuel tank which contains fuel falls below some pre-selected amount, such as 20%, and to allow the driver the possibility of selecting a revised journey route in order to reach a nearby fuel station. Possible advantages of this embodiment of the invention are that it may enable the vehicle to reduce or to minimize the number of visits to fuel stations required during the life of the vehicle, thereby reducing time wasted, or to reduce or to minimize the distance traveled to fuel stations during the life of the vehicle, thereby reducing fuel wasted in travelling to fuel stations.

A further example of an embodiment of the invention according to FIG. 1 is as follows. Performance indices relating to the performance of the vehicle are calculated by the on-board computer 100 based on data obtained via the network data bus 12 from sensors in the vehicle, such the fuel tank sensor 105, amongst others. Such performance indices might relate to the vehicle fuel efficiency, the engine temperature, the oil pressure variation rate, the number of engine revolutions per minute, the current flowing from the vehicle battery, the vehicle battery voltage, or the water level, for example. If any performance index relating to the performance of the vehicle calculated by the on-board computer 100 falls outside a range of acceptable values, or is varying at a rate which falls outside a range of acceptable values, an alert may be given, such as on the portable navigation device 11 display or via the vehicle's speakers 101. A series of options could be offered by the portable navigation device 11 such as a revised route where one passes by the nearest vehicle service station to the journey start point, a revised route which enables one to visit a vehicle service station with the minimum deviation from the originally planned route, a route which enables one to visit a vehicle service station as far as possible into the originally planned route before the extrapolated value of a performance index will be in a range which gives grounds for serious concern, or an unchanged route. The options could be offered on the portable navigation device 11 display or via the vehicle's speakers 101, or both; the preferred option could be selected via the portable navigation device 11 touch screen or by a verbal command which is processed by the vehicle's voice recognition interface and system 104. Once the option is selected, the selected option may be confirmed by being briefly displayed on the portable navigation device 11 display or by announcement via the vehicle's speakers 101, or both.

An advantage of this embodiment of the invention is that it may enable a problem with the vehicle to be rectified by a vehicle service station or by a user of the vehicle before it turns into a more serious problem.

A further example of an embodiment of the invention according to FIG. 1 is as follows. If the portable navigation device 11 is unable to receive a signal from the global positioning system, the portable navigation device 11 may be able to estimate the vehicle position through the use of vehicle speed and direction data accessed via the network data bus 12. Direction data could be accessible from a gyroscope or from a compass, for example.

A further example of an embodiment of the invention according to FIG. 1 is as follows. The portable navigation device 11 may be used to import data files, such as audio data files or video data files, from outside the vehicle for use in the vehicle. The portable navigation device 11 may be removed from the vehicle and taken to another environment such as the home environment. In the home environment, the portable navigation device 11 may receive certain files such as audio data or video data files, via a wireless connection or via a non-wireless connection. When the portable navigation device 11 is returned to the vehicle, the audio or video data files may be used to play preferred music in the car, or to show a movie on an in-car screen, for example. These files may be streamed via the network data bus 12.

A further example of an embodiment of the invention according to FIG. 1 is as follows. A state body with legal authority may interface with the portable navigation device 11, such as via the network data bus 12 and the internet connection 15, or through a mobile communications connection. Upon determining the vehicle's position by using data obtained from the portable navigation device 11, the state body with legal authority may take a variety of actions. For example, if the vehicle is in an area with significant fog levels, the state body with legal authority may turn on the vehicle's fog lights by issuing an appropriate command to the network data bus 12. Upon calculating the vehicle's speed using a series of position readings obtained from the portable navigation device 11 and with reference to a clock, a speeding ticket may be issued by the state body with legal authority if the speed limit has been exceeded by the vehicle. Upon obtaining a unique vehicle identification signature, such as a chassis number, from data obtained from the network data bus 12, data obtained from the portable navigation device 11 with regard to the vehicle's position and with reference to a clock, a journey pricing system may be operated by the state body with legal authority such as by debiting a bank account which is associated with the vehicle based on the travel performed by the vehicle.

A further example of an embodiment of the invention according to FIG. 1 is as follows. It may be more practical to achieve an upgrade to the vehicular electronic systems as a whole, including those items which have been post-factory installed such as a portable navigation device 11, if the upgrade is achieved via an upgrade to the portable navigation device 11 rather than as an upgrade to some other part of the vehicular electronic systems. For example, added functionality for the portable navigation device 11, which involves improved exploitation of data available through the network data bus 12, may be generated by new software. Such software could be installed in the portable navigation device 11 by a device which interfaces with the network data bus 12, or from a local area network or internet site which interfaces with the network data bus 12. Such an upgrade capability may be of benefit to the portable navigation device 11 manufacturer, as it may mean that a portable navigation device 11 may be released for sale, with planned software upgrades which enable enhanced vehicular electronic systems functionality to be made in the future, rather than having to write and release for sale all software prior to portable navigation device 11 product release.

A further example of an embodiment of the invention according to FIG. 1 is as follows. Various devices within the vehicle may be configured according to parameters which are stored with respect to a defined user profile denoted by a unique user number or a unique user name, where the user is a user of the vehicle. For example, vehicle user profile "Fred" may comprise the driver seat being set at a distance of 10 cm from its closest distance of approach to the driver pedals, the driver seat back tilted at 10 degrees from the vertical in the direction opposite to that of the windscreen, the seat base tilted towards the driver pedals by 5 degrees from the horizontal, the radio set to FM frequency 89.0 MHz at volume level seven, and the air flow temperature set to 20 degrees Celsius, at the minimum non-zero air flow rate, for all air emitting apertures in the vehicle cabin. For example, the vehicle user profile "Fred" may have been configured using an in-vehicle data entry and data recordation system, or it may have been configured by data entry at the portable navigation device 11, where the portable navigation device 11 is able to access the vehicle data entry and recording system via the network data bus 12. A user of the portable navigation device 11 may be able to configure the portable navigation device 11 according to a user profile denoted by a unique user number or a unique user name, where the user is a user of the portable navigation device 11. A user profile for the portable navigation device 11 may enable the user to record parameters such as the preferred level of portable navigation device screen brightness, a preference for routes comprising express roads over routes comprising non-express roads, a preference for routes comprising toll roads over routes comprising non-toll roads, a preferred zoom level for map display, a preferred map colour scheme, a preferred instruction voice, a set of preferred destinations, and a preferred welcome greeting, for example. The user profile for the portable navigation device 11 may allow the user to enter a set of parameters which indicate the required settings for various devices within the vehicle, where the portable navigation device 11 is able to access the vehicle data entry and recording system via the network data bus 12. Alternatively, the user profile for the portable navigation device 11 may allow the user to select a user profile for the vehicle which is to be used in conjunction with the user profile for the portable navigation device 11, where the portable navigation device 11 is able to access the vehicle data entry and recording system via the network data bus 12. For example, user profile "Fred" for the portable navigation device 11 may be set up so as to include vehicle user profile "Fred" for the in-vehicle device settings. A particularly preferred method for recording the configuration of the vehicle and of the portable navigation device 11 according to parameters which are thereby stored with respect to a defined user profile denoted by a unique user number or a unique user name, where the user is a user of the vehicle and of the portable navigation device 11, is as follows. The user sets the vehicle parameters and the portable navigation device 11 parameters to the preferred state. This could include, for example, adjusting the driver seat to its preferred position, adjusting the vehicle mirrors to their preferred positions, selecting vehicle sport mode when the vehicle enters a road with a high speed limit, tuning the radio to the preferred station, setting the audio system 101 to the preferred volume, and setting the portable navigation device 11 to the preferred map colour scheme. The user then selects a function on the portable navigation device 11, such as through the touch screen or through the vehicle's voice recognition interface and system 104, which is the function for recording a new user profile or an updated user profile. Performing the function may require the entry of a personal identification number, or passing some other security procedure. It is possible that the function could be selected in some other way, such as through pressing a button in or on the vehicle or on a key fob, for example. Under the user profile name or user profile number defined by the user, the portable navigation device 11 then records its internal parameters, as well as the parameters of the vehicle, where the parameters of the vehicle are determined via network data bus 12 by accessing device parameter settings data stored in the on-board computer 100, or by interrogating the various devices connected to the network data bus 12 to determine their parameter settings. The defined user profile for the portable navigation device 11 and for the vehicle may be used to enable the parameters for the portable navigation device 11 and for the vehicle to be adjusted to their preset values when a given user selects their user profile, such as via a menu item on the portable navigation device 11 touch screen. Alternatively, the preferred internal parameters of the portable navigation device 11 and of the vehicle may be stored in the on-board computer 100; on selecting a defined user name or number, such as by pressing an appropriate button in the vehicle, the on-board computer 100 then sets up the required parameters of the vehicle and of the portable navigation device 11 by sending instructions over the network data bus 12. It is preferred that editing a particular profile may only be done after that profile has been selected by the vehicle user. It is preferred that it should be possible to delete a user profile if that is desired. It is preferred that when a vehicle is started after some period of non-use, the most recently utilised user profile is automatically selected by the vehicle.

A further example of an embodiment of the invention according to FIG. 1 is as follows. The portable navigation device 11 has a menu option which allows telephone numbers to be stored in the device memory. The portable navigation device 11 has a further menu option which allows the user to initiate a call to a telephone number which is stored in the portable navigation device 11 memory, or to a telephone number which may be entered prior to calling. User interaction with the portable navigation device 11 may be via the touch screen or via the vehicle's voice recognition interface and system 104, for example. When the user selects the portable navigation device 11 option in order to make a call, and has specified the telephone number, the portable navigation device 11 communicates via the network data bus 12 with a device with mobile phone capability, where the device with mobile phone capability is connected to the network data bus 12. After the telephone number has been dialled by the device with mobile phone capability, a communication to this effect is sent to the portable navigation device 11 to enable the portable navigation device 11 to inform the user as such. If the call is answered, a communication to this effect is sent to the portable navigation device 11 to enable the portable navigation device 11 to inform the user as such. The call may proceed by the call recipient's speech being transmitted through the vehicle audio system 101, while the vehicle driver's speech is recorded by the vehicle's voice recognition interface and system 104 and transmitted to the call recipient via the device with mobile phone capability. The call may be terminated by the vehicle driver touching the relevant menu item on the portable navigation device 11 touch screen, for example. Incoming calls may lead to a message such as "Incoming call" being displayed on the portable navigation device 11 touch screen and/or being announced over the vehicle audio system 101. The call may be accepted or rejected by the vehicle driver touching the relevant menu item on the portable navigation device 11 touch screen, for example. If the incoming call is accepted by the vehicle driver, the call may subsequently be terminated by the vehicle driver by touching the relevant menu item on the portable navigation device 11 touch screen, for example.

Other embodiments of the invention enable the transmission and receipt of information packets to and from a network data bus that provides connectivity between a portable navigation device which is not on the network data bus and a set of one or more other devices which may all be on the network data bus, or may all not be on the network data bus, or some of which may be on the network data bus, with the remaining other devices not being on the network data bus. A device is defined as being on a network data bus if it is connected to the data bus by a set of electrical conductors such as by a set of wires or cables, or by one or more optical fibres or by a set of data transmitting media such that information packets may be transmitted and received between the device and the data bus via the media.

A device is defined as being connected to the data bus and not on the data bus if information packets may be transmitted and received between the device and the data bus in some manner such as involving the transmission and reception of electromagnetic waves such as radio waves, micro-waves, infra-red waves, ultra-violet waves or optically visible radiation while the device and the data bus are not connected electrically or through an optical fibre or through any other non-wireless data transmitting medium. An intermediary communication device such as a hands free module may be present to enable communication between the portable navigation device and the network data bus.

Devices which may or may not be on a network data bus but which may be connected to a network data bus include but are not limited to a hands free module, a hands free telephone module, a speech recognition interface and system, a cell phone, a garage door opener, a radar detector, a digital music player, an alarm system, a stereo, a portable computer, a portable digital assistant, a digital camera, a video camera, a device enabling connection to the internet, a compact disc player, a security gate opening and closing device or any other electronic device. Devices which may be on a network data bus include multi information display buttons, a menu screen, multi-function steering wheel buttons, a parking distance control, a radio, a digital music system, a digital sound processor, instrument control electronics, a light control module, a telephone, an integrated liquid crystal display, an on-board computer, an on-board computer text bar, external vehicle lights, vehicle cabin lights, wipers, seat positioning systems, a seat position-recording memory system, a speedometer, a meter to record distance traveled, a vehicle active suspension system, an engine revolutions per minute counter, a handbrake sensor, a vehicle turning indicator light control system, a vehicle turning mechanism which may include a steering wheel or handlebar, an oil pressure sensor, one or more fog lights, a door opening and closing mechanism, a storage space opening and closing mechanism, a window opening and closing mechanism, an air flow control system, an air conditioning unit, a thermometer, and any other device originally installed in a vehicle or which may be installed in a vehicle post manufacture.

The portable navigation device may be adapted to be secured to the inside of the cabin of the motor vehicle, or to some other part of the vehicle such as the handlebars in the case of a motorbike or a bicycle, but to be readily capable of removal if desired. The portable navigation device may be a handheld one piece unit, as described in WO 2005/088254, the contents of which are incorporated by reference.

The portable navigation device may include a touch-sensitive screen. The portable navigation device may transmit and receive data packets which conform to the communications protocol of the network data bus. Alternatively the portable navigation device may transmit and receive data packets via a suitable intermediary device between the portable navigation device and the network data bus, for example the HFM 102, said intermediary device converting data to or from the communications protocol of the portable navigation device from or to the communications protocol of the network data bus, respectively. Any device which is not on the network data bus but which is connected to the network data bus or in direct or indirect communication therewith, may also utilize a suitable intermediary device in order to effect conversion between different communications protocol standards. In converting between different communications protocol standards, the intermediary device may utilize a microprocessor in order to convert between different communications protocol standards. Conversion may be achieved in real time or in an approximation to real time.

It will be appreciated by those skilled in the art that a vehicle may not possess a single data bus, but may instead possess a plurality of data buses which are interconnected to permit data flow between the data buses. But where a vehicle possesses a plurality of data buses which are interconnected, the data buses can generally be considered to be a single data bus for the purposes of this invention. The term "data bus" as used herein includes one or more data buses. Vehicular data buses comprise a communications protocol and a physical layer upon which data packets are transmitted. Existing vehicular data buses include a controller area network (CAN) bus, SAE J1850 bus, MOST bus, byteflight, OBDII, FlexRay, D2B, SMARTwireX, IDB-1394, IEBus, Intellibus, LIN bus, among others.

For cases in which a device is connected to the data bus but is not on the data bus, information packets may be transmitted and received between the device and the data bus in some manner such as by wireless transmission and reception. An example of a wireless transmission and reception standard is Bluetooth™.

If audio data is streamed between the portable navigation device and the network data bus, the audio data may be streamed in the form of MP3 audio files, or audio files of any known format.

Where the vehicle includes a speech recognition interface and system, it will be appreciated by those skilled in the art that the device which receives sound waves, such as a microphone, may be mounted anywhere in the vehicle, such as on the dashboard or on the steering wheel, or it may be mounted on a device such as a set of headphones. Likewise, if sound waves are to be transmitted to the vehicle driver or occupants, it will be appreciated by those skilled in the art that this may be accomplished via the vehicle speakers, or via an earpiece which forms part of a set of headphones, for example.

Many systems within a vehicle may form part of the controller area network, or be in communication therewith, examples including a vehicle man machine interface (MMI) system, a vehicle radio, CD, or DVD player, a vehicle ventilation or AC system, a vehicle diagnostics, service or error reporting system, a vehicle trip computer, a lane departure warning system, a park distance control system, a cruise control system, a suspension mode control system, central locking system, a seat preset system, a mirror positioning system, a vehicle gearbox, an engine management system. Of course, the PND may include one or more routines specific to these systems so as to interact with and control them, or receive pertinent information from them so as to enhance the operation of the PND, its calculation or navigation functions, or simply to provide a simple means of providing more information to the user regarding their operation.

The invention claimed is:

1. A personal navigation device (PND) comprising:
a processor;
a graphical display;
memory including map data stored in the memory;
user-input device; and
signal reception device to receive one or more wireless signals by which a present location of the PND is determinable by the processor, in conjunction with user input, desired destination information is determinable by the processor, the processor being further capable of performing route calculation and subsequent navigation functions, wherein the location determination, route calculation and navigation functions are performed by software installed on the PND; and one or more connectors by which said PND is physically connectable to third party devices or systems, said PND being adapted to establish a communication, via said physical connection, with a vehicle controller area network and thus becoming a node on the vehicle controller area network and being capable of communicating with other nodes having functionality represented by one or more signals distributed around said controller area network and received by said PND, said PND further including a first software translation layer enabling the communication between PND and one or more nodes, and a second software routine layer including one or more routines specific to the functionality of one or more of said other nodes so as to effectively communicate therewith and utilize their functionality, wherein said one or more routines, depending on user profile information available within said PND, is capable of causing a change in the current state of one or more of the nodes on said vehicle controller area network or a vehicle subsystem controlled thereby.

2. A PND according to claim 1, wherein one routine is specific to a hands free module (HFM) being a node on the vehicle controller area network, said routine effectively communicating with said HFM to both receive and act on signals representative of navigation-specific user spoken commands recognized and processed by said HFM, and to transmit audio data from said PND to said HFM.

3. A PND according to claim 2 wherein the audio data transmitted by the PND to the HFM are voice navigation instructions generated by the PND, and the HFM causes audible broadcast of such instructions by one or more in-vehicle speakers to which appropriate audio signals are deliverable by the HFM.

4. A PND according to claim 1, wherein one routine is specific to an audio reproduction system being a node on the vehicle controller area network, said routine effectively communicating with said audio reproduction system to allow for the transmission of audio data from PND thereto for audio playback therethrough.

5. A PND of claim 1, wherein one routine is specific to a voice recognition engine being a node on the vehicle controller area network and capable of recognizing PND-specific verbal instructions and conversion thereof into signals distributed on said vehicle controller area network, said routine recognizing interpreting said signals as PND-specific instructions and causing an alteration in the current operation of said PND.

6. The portable navigation device of the claim 5, wherein the routine is capable of interpreting signals representative of one or more of the following commands:
start slideshow mode;
change the current view to a navigation mode screen;
mute voice guidance;
unmute voice guidance;
activate day mode;
activate night mode;
zoom in to a map;
zoom out of a map;
show pre-selected points of interest POIs; and
hide POIs.

7. The PND of claim 1, wherein one routine is specific to a video display device being a node on the vehicle controller area network, said routine enabling the streaming of video content extant within the memory of said PND.

8. The PND of claim 1, wherein the user input device is embodied in the graphical display, which is a touch sensitive touch screen.

9. The portable navigation device of claim 8, wherein the establishment of the communication with the vehicle controller area network or nodes thereon, and enablement of the one or more routines specific to those nodes is achieved by the user interacting with menu items shown on the touch screen.

10. A PND according to claim 1, wherein a software routine within the PND receives signals from a management system being a node on the vehicle controller area network, said routine causing the periodic or snapshot storage of one or more parameters representative of at least one of vehicle operation and user control thereof.

11. A PND according to claim 10 wherein the management system is a vehicle engine management system and the one or more parameters stored by the routine are engine operating characteristics.

12. A PND according to claim 11, wherein the routine stores data that uniquely identifies the vehicle, and optionally causes the wireless transmission of stored data for at least one of road pricing, toll road access, and congestion zone access.

13. A PND according claim 1, wherein a routine is capable of upgrading the operating software of one of the nodes which together make up the controller area network.

14. A PND according to claim 1, wherein the one or more routines utilizes the functionality of one or more of the nodes, and receives information therefrom, such being passed to the route calculation function of the PND to provide enhancement therefor.

15. The PND of claim 14, wherein the information relates to one or more of: a service requirement of the vehicle, engine warning, engine diagnostic information, gyro/speed pulse information optionally used in a dead reckoning software routine provided as part of at least one of the route calculation and navigation functions of said PND relevant to a possible new destination, the outside air or road temperature, an indication that the vehicle has a major fault and a routine is provided within the device causes the user to be advised visibly and/or audibly that rerouting to a garage is appropriate, and an indication that the external temperature is below a defined threshold and wherein the PND includes a routine to cause one of (a) recalculation of an estimation of travel time on account of lower speed of travel, (b) recalculation of the route to avoid potentially icy roads, and (c) the wireless transmission of ambient temperature a remote server.

16. A PND according to claim 1, wherein a routine is provided which interacts with the route calculation and navigation functions of the PND to determine when the PND is within a threshold distance of a home location, and wherein said routine communicates, over said wireless communication, with a remote control device being a node on said vehicle controller area network within the vehicle to cause operation thereof thereby issuing a wireless signal to appropriate equipment disposed at said home location to cause operation thereof.

17. A PND according to any preceding claim 1, wherein a routine is provided which interacts with the route calculation and navigation functions of the PND and which additionally interacts with a device being a node on said vehicle controller area network, said device capable of connecting to the internet so as to retrieve information therefrom.

18. The portable navigation device of claim 17, wherein the information obtained from the internet is traffic congestion information, said routine interacting with the route calculation and navigation functions to optionally cause route recalculation or alternate navigation.

19. A PND according to claim 1, wherein a user profile routine is provided in the PND to interact with a module capable of storing one or more user-specific settings and being a node on the vehicle controller area network, the interaction being such that selection of a particular user profile stored in one of the PND and the vehicle user settings module causes one or more of the various settings stored in the profiles on both the PND and the user settings module to be applied.

20. A PND according to claim 19, wherein the user settings module or user-specific settings therein includes one or more of: a seat position memory function, a biometric user identification function capable of identifying particular users, a key or key fob recognition module, a code entry module, a map color scheme setting, a particular navigation guidance voice setting, a particular welcome greeting setting, a particular set of user-defined favorite destinations.

21. The PND of claim 19, wherein the last active user profile is automatically loaded by the device on start-up.

* * * * *